June 14, 1938.　　L. DESBORDES ET AL　　2,120,435
TRANSPORTING AND GUIDING MEANS
Original Filed Nov. 28, 1934
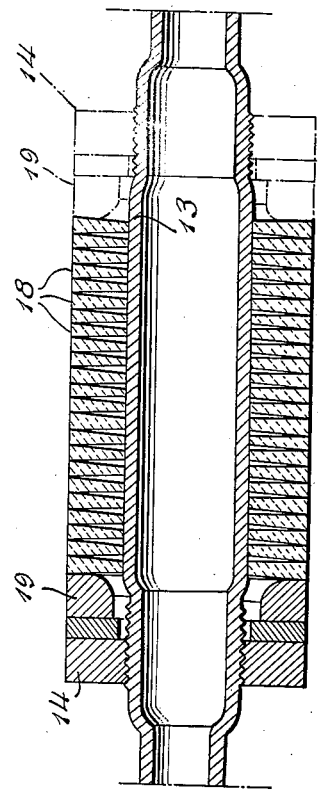
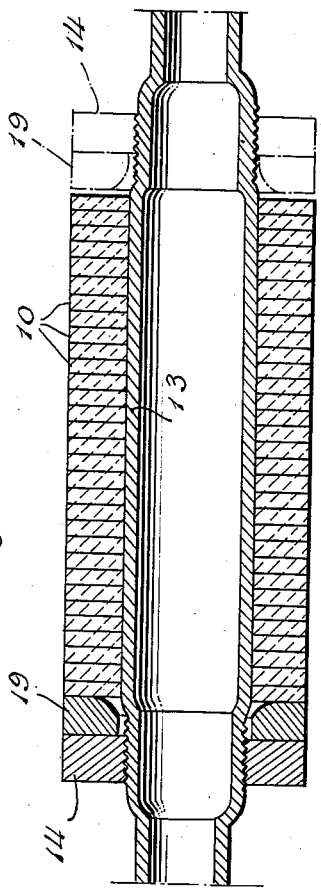
INVENTORS
LOUIS DESBORDES
PIERRE BERTRAND
BY
ATTORNEYS Patented June 14, 1938

2,120,435

UNITED STATES PATENT OFFICE 2,120,435

TRANSPORTING AND GUIDING MEANS

Louis Desbordes, Machemont, and Pierre Bertrand, Paris, France, assignors to Societe Anonyme des Manufactures des Glaces & Produits Chimiques de Saint Gobain, Chauny & Cirey, Paris, France Original application November 28, 1934, Serial No. 755,098. Divided and this application May 2, 1936, Serial No. 77,480. In France December 1, 1933

4 Claims. (Cl. 49—14)

This invention relates to transporting and guiding means and refers more particularly to rollers used for the transportation, guiding and/or drawing of hot articles, such as sheets of glass immediately after these sheets were drawn, rolled or flattened by any of the generally used methods.

The present application is a division of our copending patent application No. 755,098, filed Nov. 28, 1934.

Rollers used for the transportation of hot sheets of glass comprise usually a metallic tube or rod which forms the axle of the roller and which carries a number of discs made of asbestos. These discs are tightly packed upon the rod or tube and are used for the purpose of preventing a direct contact between the hot glass and the metallic axle.

Experience has shown that such rollers wear out rather quickly and irregularly after they have been in use for some time, whereby the outer cylindrical surfaces of the asbestos discs lose their original form. Since the sheets of glass which are transported by the rollers are often soft or not completely solidified, the irregular shape of these discs may cause the formation of grooves, ridges or other impressions upon the surfaces of the glass sheets.

An object of the present invention is the provision of rollers which may be subjected to intensive use for a considerable period of time without losing their shape and without affecting in any way the form of the articles transported by these rollers.

The above and other objects of this invention may be realized through the provision of a roller comprising a central support or axle carrying discs of asbestos or of other heat-insulating material, which are more strongly compressed at their outer surface or periphery than in their part close to the axle or central support. An important distinction between the present application and the said co-pending application is that the present application describes the use of uniform discs similar to each other and situated one next to the other.

As is known in the art, asbestos is a compressible material having a resistance to mechanical stresses which increases with an increase in compression. In the rollers of the known type, we have found by experiments that the pressure exerted on the asbestos discs at the end or ends of the roller in order to have the asbestos discs tightened together, is not regularly transmitted to the whole line of discs. On the one hand, at the periphery the discs may not be sufficiently pressed though the total pressure exerted at the end of the roller is quite great. On the other hand, the central part of each disc, under the action of the tightening pressure applied to it, tends to expand and to be pressed against the central support or axle; during the course of the tightening while manufacturing the roller, a friction occurs between the disc and the support or axle, which prevents the complete transmission of the tightening pressure, resulting in an uneven distribution of the compression of the asbestos along the whole length of the roller and consequently in an uneven resistance to wear.

In the rollers manufactured according to the present invention, the outer surface which has to resist the wear, receives the greater part of the tightening pressure exerted on the end or ends of the roller; moreover, the frictions upon the axle of the roller, which may alter the transmission of the entire tightening pressure, are, if not entirely avoided, lessened for their greatest part.

The invention will appear more clearly from the following detailed description when taken in connection with the accompanying drawing showing different embodiments of the inventive idea, before the heat-insulating discs are compressed.

In the drawing:

Figure 1 is a longitudinal section of a part of a roller constructed according to the present invention.

Figure 2 shows in longitudinal section a roller of a some-what different construction.

In Figure 1 the asbestos discs 18 are all of the same type, their thickness decreasing from the periphery toward the axle in a continuous manner. These discs are placed one next to the other upon a central support or axle 13 and then the discs are pressed one against the other, for example, by means of the nuts 14.

The decreasing of the thickness of the discs 11 from the periphery toward the axis may also be carried out in steps.

In Figure 2 the asbestos discs 10 are all of the ordinary known type, with a uniform thickness, but the tightening members 19 placed at both ends of the rollers have such a shape that the distance between both members is smaller at the periphery than close to the center of the roller in order that the pressure exerted on the asbestos discs be greater at the periphery than in the neighborhood of the axle. These tightening members 19 may also be applied with rollers constituted as shown in Figure 1.

The word "asbestos" has always been used hereinabove to designate the material constituting a certain number of the discs, but the present invention refers also to rollers constituted by discs or collars of heat-insulating material similar to asbestos. The word "axle" used to designate the support of the discs may be applied to all the means carrying the discs and used as supports for their tightening.

What is claimed is:

1. A method for the manufacture of a roller constituted by a support and a plurality of similar uniform discs made of the same compressible heat-resisting material, carried by said support, which comprises placing the discs one next to the other upon the support and then compressing the outer parts of the discs more than their central parts.

2. A roller comprising a support, a plurality of similar discs made of a compressible heat-resisting material, carried one next to the other upon said support and having a thickness which decreases from the periphery toward the center of the discs, and means constructed and arranged to press said discs one against the other so that the outer parts of said discs are compressed more than their central parts.

3. A roller comprising a support, a plurality of discs made of a compressible heat-resisting material carried one next to the other upon said support and having a thickness which decreases from the periphery toward the center of the disc, and tightening members at both ends of the roller having such a shape as to produce a greater pressure on the periphery than on the inner part of the discs.

4. A roller comprising a support, a plurality of discs made of a compressible heat-resisting material carried one next to the other by said support and having a uniform thickness, and tightening members at both ends of the roller having such a shape as to produce a greater pressure on the periphery than on the central parts of the discs.

LOUIS DESBORDES.
PIERRE BERTRAND.